US010596923B2

(12) United States Patent
Baccouche et al.

(10) Patent No.: US 10,596,923 B2
(45) Date of Patent: Mar. 24, 2020

(54) DOOR MOUNTED VEHICLE SEAT (71) Applicant: Ford Global Technologies, LLC, Dearborn, MI (US)

(72) Inventors: Mohamed Ridha Baccouche, Ann Arbor, MI (US); Saied Nusier, Canton, MI (US); Rahul Arora, Brimingham, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/450,293

(22) Filed: Mar. 6, 2017

(65) Prior Publication Data
US 2018/0251042 A1 Sep. 6, 2018

(51) Int. Cl.
*B60N 2/01* (2006.01)
*B60J 5/04* (2006.01)
*B60N 2/015* (2006.01)
*B60N 2/005* (2006.01)
*B60N 2/06* (2006.01)
*B60N 2/02* (2006.01)
(Continued)

(52) U.S. Cl.
CPC ............ *B60N 2/015* (2013.01); *B60J 5/0423* (2013.01); *B60J 5/0479* (2013.01); *B60N 2/005* (2013.01); *B60N 2/01* (2013.01); *B60N 2/0224* (2013.01); *B60N 2/0232* (2013.01); *B60N 2/06* (2013.01); *B60N 2/062* (2013.01); *E06B 3/362* (2013.01); *E06B 7/28* (2013.01); *B60N 2002/0216* (2013.01); *E05F 15/611* (2015.01); *E05F 15/73* (2015.01); *E05Y 2400/44* (2013.01); *E05Y 2400/80* (2013.01); *E05Y 2900/531* (2013.01)

(58) Field of Classification Search
CPC ........ B60N 2/14; B60N 2/0232; B60N 2/449; B60N 2/305; B60N 2002/0256; B60N 2/20; B60N 2/01508; B60J 5/101; B60J 5/047; B60J 7/1642; E05B 77/12; E05B 81/14
USPC ........ 296/68, 68.1, 63, 66, 146.4, 64, 65.14, 296/65.11, 19, 62; 297/344.21, 344.24, 297/378.12, 284.1, 344.26, 216.14, 311; 180/286, 271, 209, 219, 89.13, 89.14, 907
See application file for complete search history.

(56) References Cited
U.S. PATENT DOCUMENTS 3,801,149 A * 4/1974 Reimann .................. B60J 5/047
296/156
3,833,253 A * 9/1974 Butler ...................... B60P 3/32
296/165
(Continued)

FOREIGN PATENT DOCUMENTS

JP 2001322482 A 11/2001
JP 2002144925 A 5/2002
(Continued)

*Primary Examiner* — D Glenn Dayoan
*Assistant Examiner* — Sunsurraye Westbrook
(74) *Attorney, Agent, or Firm* — David Coppiellie; Bejin Bieneman, PLC (57) ABSTRACT A vehicle includes a body and a door moveable relative to the body between the open and closed position. The vehicle includes a seat fixed relative to the door. The seat includes a seat back and a seat bottom. The body has a longitudinal axis, and the seat bottom extends from the seat back toward the longitudinal axis along a cross-vehicle direction perpendicular to the longitudinal axis when the door is in the closed position.

20 Claims, 6 Drawing Sheets (51) Int. Cl.
*E06B 3/36* (2006.01)
*E06B 7/28* (2006.01)
E05F 15/611 (2015.01)
E05F 15/73 (2015.01)

(56) References Cited

U.S. PATENT DOCUMENTS

| | | | | |
|---|---|---|---|---|
| 3,944,277 | A * | 3/1976 | Cyphert | B60N 2/062 |
| | | | | 296/68 |
| 4,341,415 | A * | 7/1982 | Braun | B60N 2/06 |
| | | | | 296/64 |
| 5,540,539 | A | 7/1996 | Wolfman et al. | |
| 5,636,884 | A * | 6/1997 | Ladetto | B60N 2/06 |
| | | | | 296/65.09 |
| 5,890,758 | A * | 4/1999 | Pone | B60N 2/3011 |
| | | | | 296/66 |
| 6,116,676 | A * | 9/2000 | Edwards | B60N 2/3011 |
| | | | | 296/64 |
| 6,460,922 | B1 * | 10/2002 | Demick | B60N 2/3034 |
| | | | | 296/65.11 |
| 6,547,303 | B1 | 4/2003 | Anderson | |
| 6,981,731 | B2 * | 1/2006 | Welch | B60J 5/101 |
| | | | | 296/64 |
| 7,862,287 | B2 * | 1/2011 | Egan | B60N 2/245 |
| | | | | 414/541 |
| 2016/0264021 | A1 | 9/2016 | Gillett | |

FOREIGN PATENT DOCUMENTS

| | | |
|---|---|---|
| JP | 2003204994 A | 7/2003 |
| JP | 5497608 B2 | 3/2014 |

* cited by examiner

DOOR MOUNTED VEHICLE SEAT

BACKGROUND

A vehicle may include a vehicle body and a plurality of doors. The vehicle may include seats for supporting occupants. The seats may be mounted to a floor of the vehicle, and the doors may be opened and closed to allow for occupant ingress and egress. One arrangement of the seats is where the seats are in a forward-facing orientation.

DETAILED DESCRIPTION

With reference to the Figures, wherein like numerals indicate like parts throughout the several views, a vehicle 10 includes a body 12 having a longitudinal axis L, and a door 14, 16 supported by the body 12. The door 14, 16 is moveable relative to the body 12 between open and closed positions. The vehicle 10 includes a seat 18 fixed relative to the door 14, 16. The seat 18 includes a seat back 20 and a seat bottom 22. The seat bottom 22 extends from the seat back 20 toward the longitudinal axis L along a cross-vehicle direction perpendicular to the longitudinal axis L when the door 14, 16 is in the closed position.

The seat 18 may include a track 24 fixed to the door 14, 16. The track 24 supports the seat bottom 22 on the door 14, 16. The track 24 may be cantilevered from the door 14, 16. The seat bottom 22 may be moveable along the track 24 in the cross-vehicle direction when the door 14, 16 is in the closed position. The vehicle 10 may include a seat motor 26, as identified in FIG. 2, engaged with the seat bottom 22 and the track 24 to move the seat 18 along the track 24. The door 14, 16 may include a door outer 28, a door inner 30, and a reinforcement 32 between the door outer 28 and the door inner 30. The track 24 may be supported by the reinforcement 32.

The vehicle 10 may include a rocker 34 below the door 14, 16 in the closed position, and locking members 36 between the rocker 34 and the door 14, 16, the locking members 36 releasably locking the rocker 34 and the door 14, 16 to each other.

The vehicle 10 may include a rocker 34 below the door 14, 16 in the closed position, wherein the door 14, 16 includes a door outer 28, a door inner 30, and a reinforcement 32 between the door outer 28 and the door inner 30, and the vehicle 10 further includes locking members 36 releasably locking the rocker 34 and the door 14, 16 to each other.

The door 14, 16 may include a door outer 28, a door inner 30, and a reinforcement 32 between the door outer 28 and the door inner 30, the track 24 being supported by the reinforcement 32.

The vehicle 10 may include a second door 14, 16 supported by the body 12 and moveable relative to the body 12 between open and closed positions, and a second seat 18 fixed relative to the second door 14, 16, the second seat 18 including a seat back 20 and a seat bottom 22, the seat back 20 and the seat bottom 22 of the second seat 18 extending from the seat back 20 of the second seat 18 toward the longitudinal axis L along the cross-vehicle direction when the second door 14, 16 is in the closed position. The door 14, 16 and the second door 14, 16 may be adjacent to each other in the closed position, and the vehicle 10 may include locking members 38 between the door 14, 16 and the second door 14, 16, the locking members 38 releasably locking the door 14, 16 and the second door 14, 16 to each other when the door 14, 16 and the second door 14, 16 are in the closed position. When the door 14, 16 and the second door 14, 16 are in the open position, the seat bottom 22 of the seat 18 may extend from the seat back 20 of the seat 18 toward the second seat 18, and the seat bottom 22 of the second seat 18 may extend from the seat back 20 of the second seat 18 toward the seat 18. The vehicle 10 may include a forward pillar 40, a rearward pillar 42, and a door opening 50 extending continuously from the forward pillar 40 to the rearward pillar 42, the door 14, 16 being hinged to the forward pillar 40, and the second door 14, 16 being hinged to the rearward pillar 42. The door 14, 16 and the second door 14, 16 may abut each other between the forward pillar 40 and the rearward pillar 42 when the door 14, 16 and the second door 14, 16 are in the closed position.

The door 14, 16 and the second door 14, 16 may be spaced from each other on opposite sides of the longitudinal axis L. When the door 14, 16 and the second door 14, 16 are in the closed position, the seat bottom 22 of the seat 18 may extend from the seat back 20 of the seat 18 toward the second seat 18, and the seat bottom 22 of the second seat 18 may extend from the seat back 20 of the second seat 18 toward the seat 18.

As shown in FIGS. 1, 2, 4 and 5, the vehicle 10 may include a door motor 52 between the body 12 and the door 14, 16 to move the door 14, 16 relative to the body 12 between the open position and the closed position.

Figure 1:
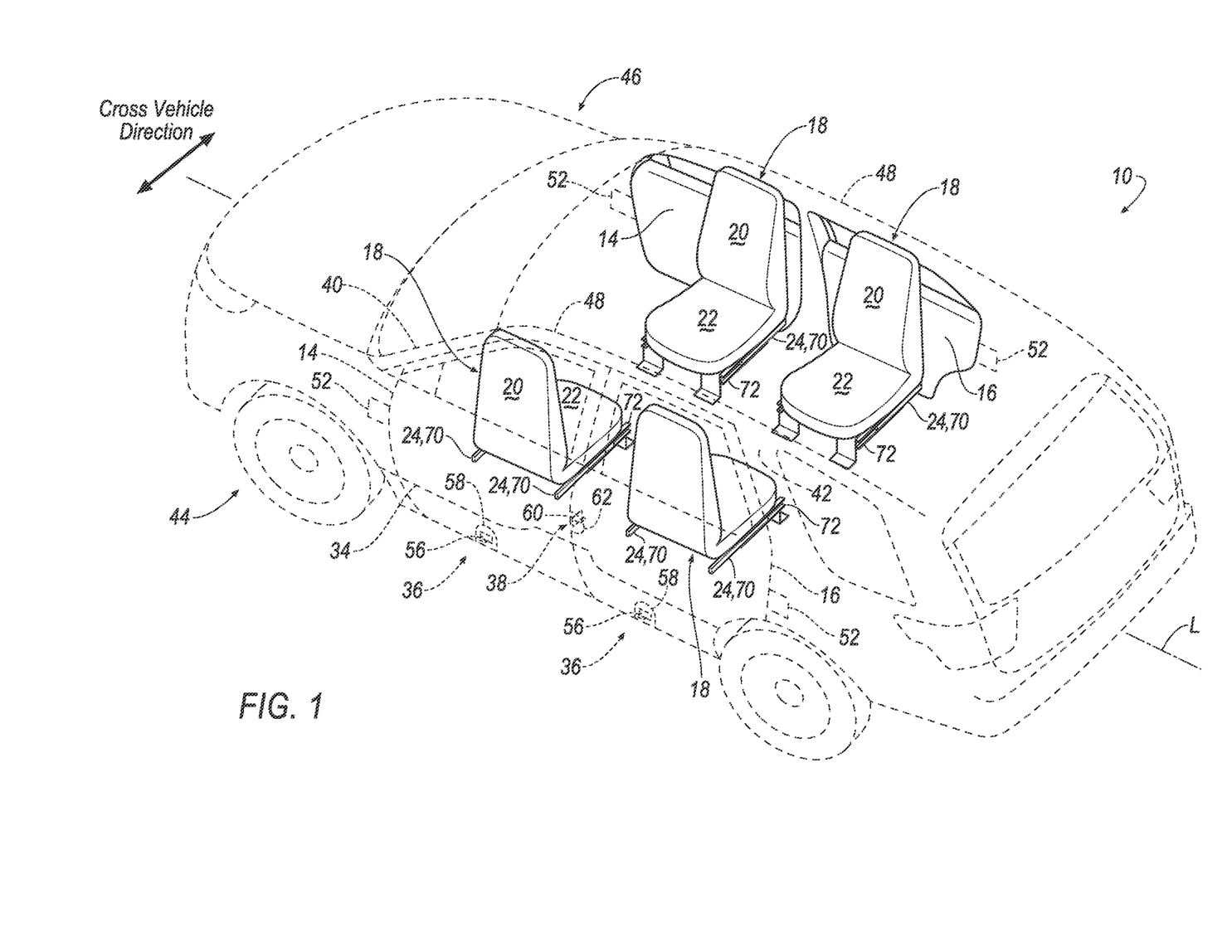
FIG. 1 is a perspective view of a vehicle that includes a body and doors in a closed position, with the body and doors shown in broken lines to show seats mounted to the doors inside the vehicle.
Figure 2:
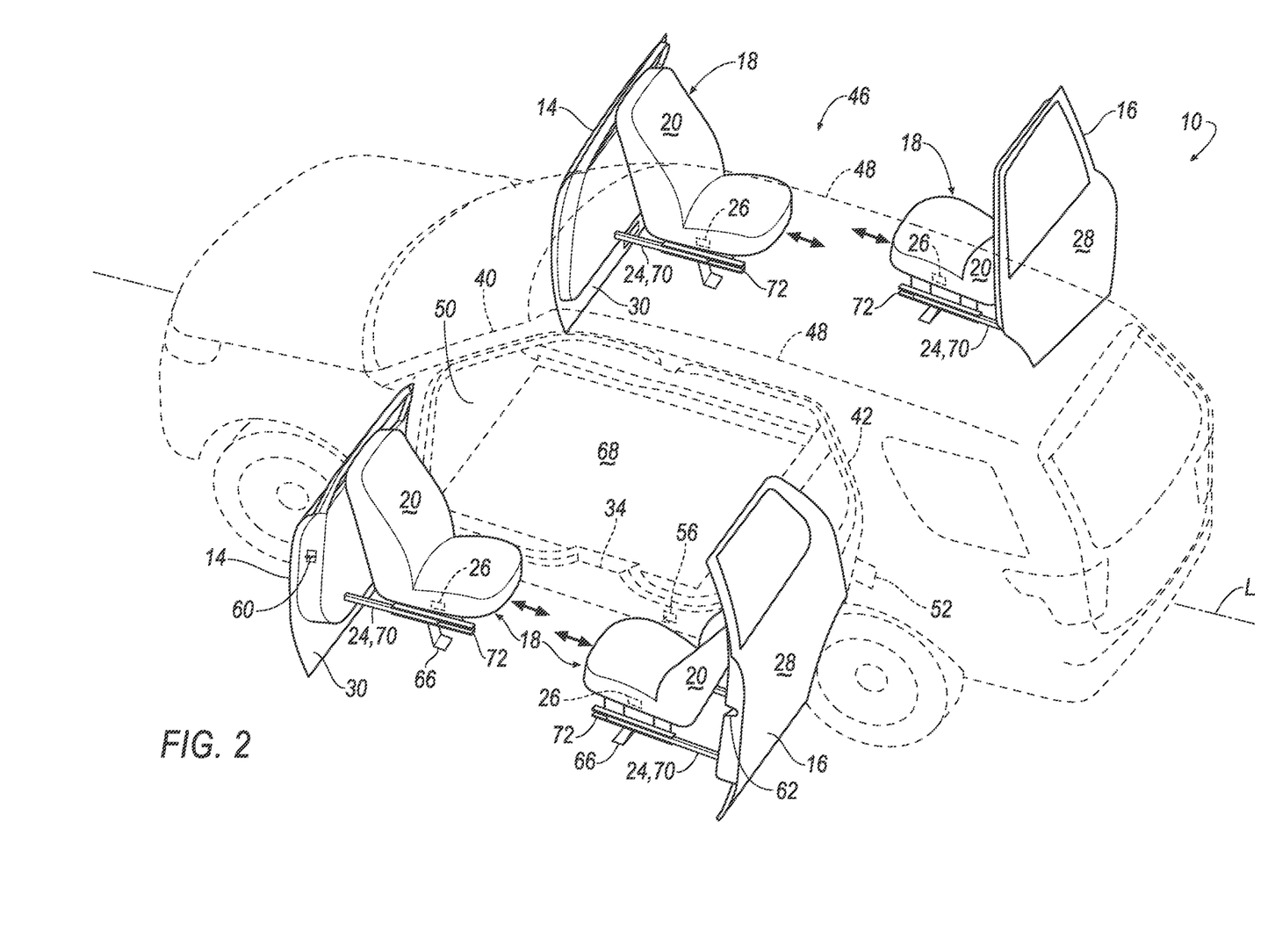
FIG. 2 is a perspective view of the vehicle with the doors in the open position.

With reference to FIGS. 1 and 2, the seat 18 moves with the door 14, 16 as the door 14, 16 is moved between the closed position, as shown in FIG. 1, and the open position, as shown in FIG. 2. Specifically, since the seat bottom 22 extends from the seat back 20 toward the longitudinal axis L along the cross-vehicle direction perpendicular to the longitudinal axis L when the door 14, 16 is in the closed position, an occupant of the seat 18 faces in the cross-vehicle direction when the door 14, 16 is in the closed position. This position of the occupant may be convenient during operation of the vehicle 10, allowing the occupant to interact with other occupants of the vehicle 10. This may be particularly convenient in an example where the vehicle 10 is an autonomous vehicle 10 in which occupant input is not required to operate the vehicle 10. In addition, as shown in FIG. 2, since the seat 18 moves with the door 14, 16 as the door 14, 16 moves from the closed position to the open position, the seat 18 is positioned to allow the occupant to conveniently embark and disembark the seat 18.

The vehicle 10 may be any suitable type of vehicle 10, e.g., an automobile, including a sedan, a pick-up truck, a sport-utility vehicle 10, etc. As set forth above, the vehicle 10 may be an autonomous vehicle 10. For example, the vehicle 10 may have a computer that may control the operations of the vehicle 10 in an autonomous mode, a semi-autonomous mode, or a non-autonomous mode. For purposes of this disclosure, an autonomous mode is defined as one in which each of vehicle 10 propulsion, braking, and steering are controlled by the computer; in a semi-autonomous mode the computer controls one or two of vehicles 10 propulsion, braking, and steering; in a non-autonomous mode, a human operator controls the vehicle 10 propulsion, braking, and steering.

With reference to FIGS. 1-5, the vehicle 10 includes the body 12. The body 12 includes the rocker 34, the forward pillar 40, and the rearward pillar 42. As shown in the Figures, the body 12 has a unibody construction, i.e., a unitary-body construction. In the unibody construction, the body 12, e.g., rockers 34, serves as the vehicle frame, and the body 12 (including the rockers 34, the pillars 40, 42, roof beams 48, etc.) is unitary, i.e., a continuous one-piece unit. As another example not shown in the Figures, the body and a frame of the vehicle 10 may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, etc.

As set forth above, the body 12 has the longitudinal axis L. The longitudinal axis L extends along a vehicle-forward direction and a vehicle-rearward direction. The vehicle 10 includes a left side 44 and a right side 46 spaced from each other along the cross-vehicle direction perpendicular to the longitudinal axis L. The left side 44 and the right side 46 may each include one rocker 34, one forward pillar 40, one rearward pillar 42, and doors 14, 16. Common numerals are used to identify common features of the left side 44 and the right side 46. The left side 44 and the right side 46 may be mirror images of each other about the longitudinal axis L, or at least may include several features that are mirror images about the longitudinal axis L.

The rockers 34 are elongated along the longitudinal axis L. The forward pillar 40 and the rearward pillar 42 may be fixed to the rocker 34 and extend upwardly from the rocker 34 to the roof beam 48. The forward pillar 40 and the rearward pillar 42 are fixed to the respective rocker 34.

The body 12 defines the door opening 50 between the forward pillar 40 and the rearward pillar 42, and between the rocker 34 and the roof beam 48. The forward pillar 40 and the rearward pillar 42 are spaced from each other along the longitudinal axis L. Specifically, the forward pillar 40 and the rearward pillar 42 may be disposed on opposite sides of the door opening 50. For example, the forward pillar 40 may be referred to as an A-pillar. The rearward pillar 42 may be referred to as a C-pillar (and the body 12 does not include a pillar between the first pillar 16 and the second pillar 18 typically referred to as a B-pillar).

The door opening 50 extends continuously from the forward pillar 40 to the rearward pillar 42, and extends continuously from the rocker 34 to the roof beam 48. The vehicle structure 10 may assist with the ingress and/or egress of the occupant through the door opening 50 because the door opening extends continuously from the forward pillar 40 to the rearward pillar 42. The increased size of the door opening 20, for example, may be useful in an autonomous vehicle.

As set forth above, the door 14, 16 is supported by the body 12 of the vehicle 10. Specifically, the vehicle 10 includes a plurality of doors 14, 16 supported by the body 12. The vehicle 10 may include a front door 14 and a rear door 16. The front door 14 and the rear door 16 are adjacent to each other in the closed position. The front door 14 and the rear door 16 may abut each other between the forward pillar 40 and the rearward pillar 42 when the door 14, 16 and the second door 14, 16 are in the closed position.

Both the right side 46 and the left side 44 of the vehicle 10 may include a front door 14 and a rear door 16. In this configuration, the front doors 14 may be spaced from each other on opposite sides of the longitudinal axis L, and the rear doors 16 may be spaced from each other on opposite sides of the longitudinal axis L. The vehicle 10, alternatively, may have any suitable number of doors 14, 16. Common numerals are used to identify common features of the doors 14, 16.

Figure 3:
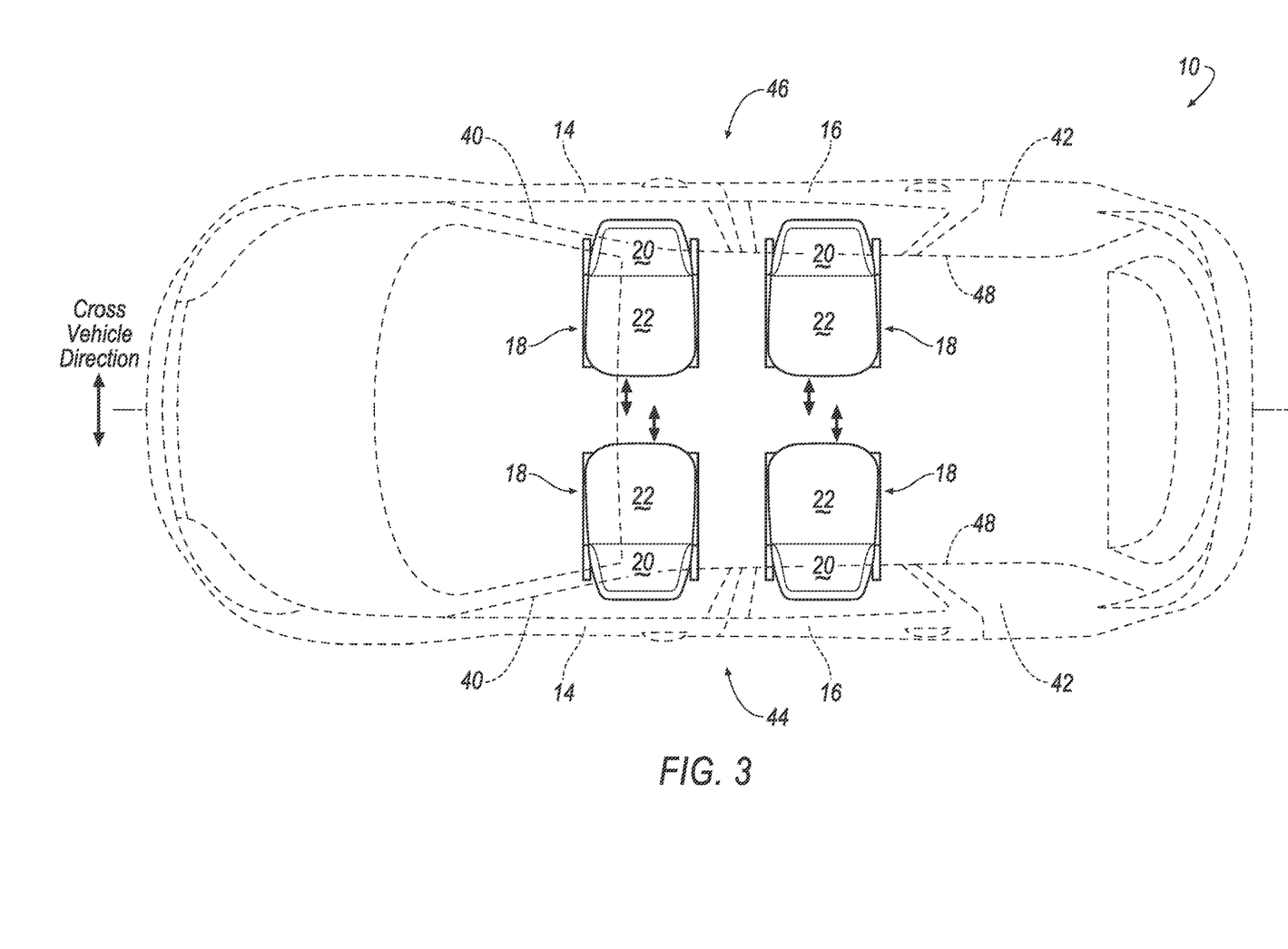
FIG. 3 is a top view of the vehicle with the body and the doors in broken lines to show the seats inside the vehicle.
Figure 4:
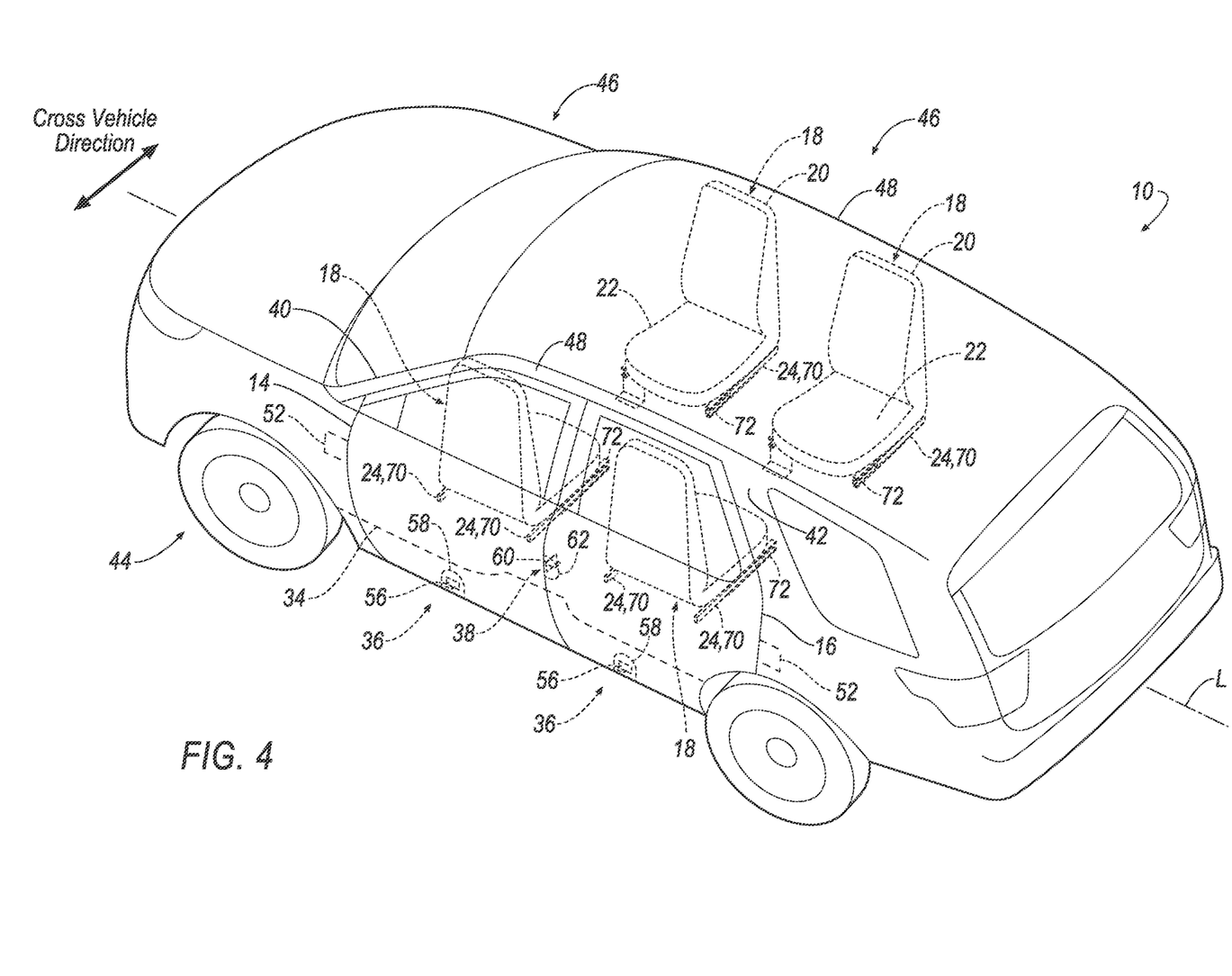
FIG. 4 is a perspective view of the vehicle with the seats shown in hidden lines.

The doors 14, 16 are moveable relative to the body 12 between the closed position, as shown in FIGS. 1, 3, and 4, and the open position, as shown in FIG. 2. Each door 14, 16 may be moveable between the open and closed positions independently of each other. In other words, any one of the doors 14, 16 may be open or closed regardless of the opposition of the other doors 14, 16. The rockers 34 are below the doors 14, 16 when the doors 14, 16 are in the closed position. When the doors 14, 16 are in the closed position, the doors 14, 16 retain occupants in the vehicle 10. When the doors 14, 16 are in the open position, the doors 14, 16 allow occupant ingress and egress.

The doors 14, 16 may be hinged to the body 12. In other words, a hinge (not numbered) may be between each door 14, 16 and the body 12. The front doors 14 may be hinged to the forward pillars 40, and the rear doors 16 may be hinged to the rearward pillars 42. The door 14, 16 may include a door outer 28, a door inner 30, and a reinforcement 32 between the door outer 28 and the door inner 30.

The doors 14, 16 may be automatically and/or manually moveable between the open and closed positions. For automatic movement, the vehicle 10 may include door motors 52 between the body 12 and the doors 14, 16 to move the doors 14, 16 relative to the body 12 between the open position and the closed position. The vehicle 10 may include an input device to detect the occupant. For example, the input device may be a keypad on the body 12. As another example, the input device may be a proximity sensor that senses an identifier, e.g., a key fob, a mobile phone, etc. As another example, the input device may be a push button on a key fob. The vehicle 10 may include a computer, e.g., a door module and/or a door lock module, that controls operation of the door motors 52 based on the input device. For manual movement, the doors 14, 16 may have handles 64 that may be manually grasped to open the doors 14, 16.

The door outer 28 may be fixed to the door inner 30 by flanging, welding, or in any other suitable fashion. The door 14, 16 may include a trim panel 54 fixed to the door inner 30 in any suitable way, e.g., threaded fasteners, clips, push-pins, Christmas-tree fasteners, etc. The door outer 28 and the door inner 30 may be formed of metal (e.g., aluminum, steel, etc.), composite material (e.g., fiber reinforced thermoplastic, sheet molding compound (SMC), etc., or any suitable material. The door outer 28 may have a class-A surface facing exteriorly, i.e., a surface specifically manufactured to have a high-quality, finished aesthetic appearance free of blemishes. The trim panel 54 may be formed of plastic, foam, leather, vinyl, etc. and combinations thereof. The trim panel 54 may have a class-A surface facing the passenger cabin, i.e., a surface specifically manufactured to have a high-quality, finished aesthetic appearance free of blemishes.

The reinforcement 32 may be disposed between the door outer 28 and the door inner 30, i.e., may be sandwiched between the door outer 28 and the door inner 30. Since the trim panel 54 is mounted to the door inner 30, the reinforcement may also be between the door outer 28 and the trim panel 54. The reinforcement 32 is fixed relative to the door outer 28 and the door inner 30, and may be fixed to the door outer 28 and/or the door inner 30. The reinforcement 32 may be of any suitable size and shape and, for example, may be disposed proximate the rocker 34 relative to the rest of the door 14, 16. The reinforcement 32 may be formed of metal (e.g., aluminum, steel, etc.), composite material (e.g., fiber reinforced thermoplastic, sheet molding compound (SMC), etc.), or any suitable material.

Figure 5:
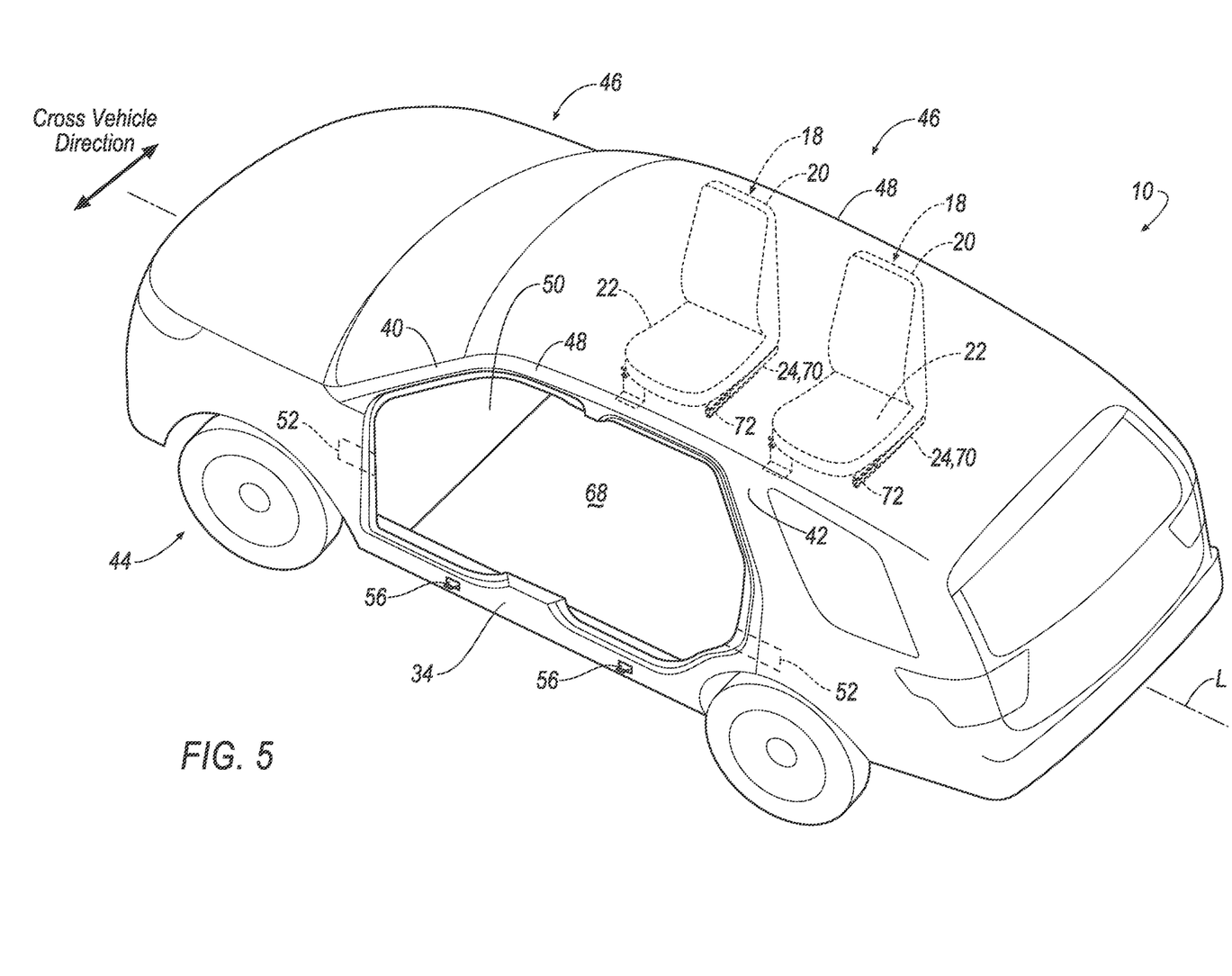
FIG. 5 is a perspective view of the vehicle with the doors of a left side of the vehicle removed to show locking members.
Figure 6:
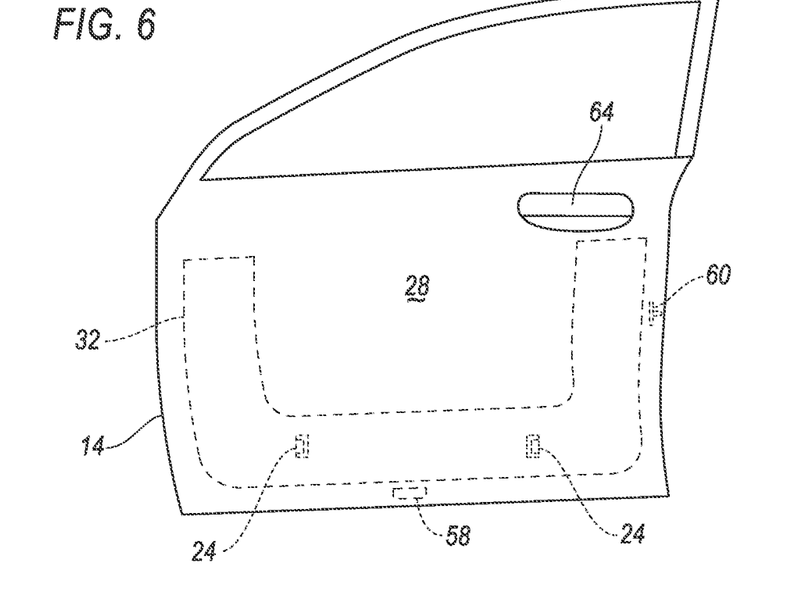
FIG. 6 is a side view of one of the doors including a reinforcement and a locking member shown in hidden lines.

With reference to FIGS. 1, 4, and 5, the vehicle 10 includes locking members 36 between the rocker 34 and any one or all doors 14, 16. In other words, locking members 36 may be between the rocker 34 and the front door 14 of the left side, locking members 36 may be between the rocker 34 and the rear door 16 of the left side 44, locking members 36 may be between the rocker 34 and the front door 14 of the right side 46, and locking members 36 may be between the rocker 34 and the rear door 16 of the right side 46.

The locking members 36 are fixed to the rocker 34 and the reinforcement 32 of the door 14, 16. In such a configuration, the locking members 36 tie the reinforcement 32 of the door 14, 16 to the rocker 34 to reinforce the door 14, 16. In other words, with the reinforcement 32 of the door 14, 16 locked to the rocker 34, forces are transferred from the door 14, 16 to the rocker 34, e.g., during a vehicle 10 impact, to reinforce the door 14, 16.

The locking members 36 releasably lock the rocker 34 and the door 14, 16 to each other. The locking members 36 may include a striker 56 on one of the door 14, 16 and the rocker 34, and a latch 58 releasably engageable with the striker 56 on the other of the door 14, 16 and the rocker 34. The latch 58 may be engageable between the locked position, in which the striker 56 is engaged with the latch 58, and the unlocked position, in which the striker 56 is disengaged with the latch 58. In the locked position, the latch 58 prevents the door 14, 16 from pivoting relative to the pillar 40, 42. In the unlocked position, the latch 58 allows the door 14, 16 to pivot relative to the pillar 40, 42. When the door 14, 16 is in the closed position, the latch 58 may be designed to receive the striker 56. In other words, the latch 58 may be sized, shaped, and positioned to receive the striker 58 when the door 14, 16 is in the closed position.

As another example, the locking members 36 may include a retractable post (not shown) on one of the rocker 34 and the door 14, 16, and a slot (not shown) releasably engageable with the retractable post on the other of the rocker 34 and the door 14, 16. The post may be moveable between the locked position, in which the retractable post is engaged with the slot, and the unlocked position, in which the retractable post is disengaged with the slot. Alternatively, the locking members 36 may be of any suitable type, e.g., any type of latch/striker, any type of post/keeper, solenoid actuated pins/slots, etc.

Figure 7:
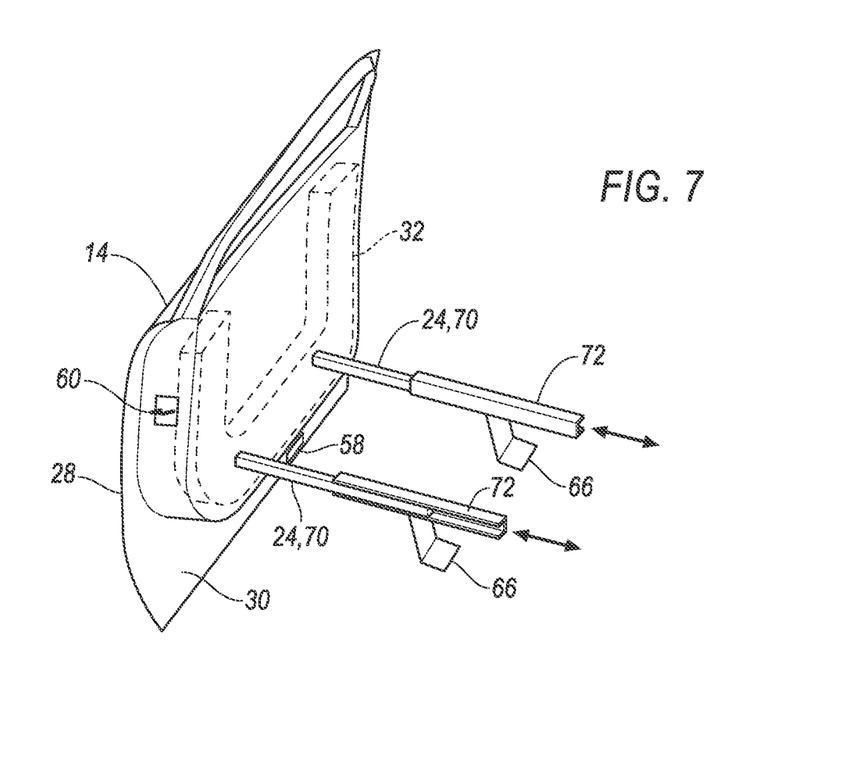
FIG. 7 is a perspective view of the door and a track of the seat mounted to the door.

With reference to FIGS. 1, 2, and 7, the vehicle 10 may include locking members 38 between the front door 14 and the rear door 16. The locking members 38 may releasably lock the door 14, 16 and the second door 14, 16 to each other when the door 14, 16 and the second door 14, 16 are in the closed position.

The locking members 38 are fixed to the front door 14 and the rear door 16. For example, the locking members 38 may be fixed to the reinforcements 32 of the front door 14 and the rear door 16. In such a configuration, the locking members 38 tie the reinforcements 32 of the front door 14 and the rear door 16 to each other to reinforce both the front door 14 and the rear door 16. In other words, with the reinforcement 32 of the front door 14 locked to the reinforcement 32 of the rear door 16, forces are transferred between the front door 14 and the rear door 16, e.g., during a vehicle 10 impact, to reinforce the front door 14 and the rear door 16. The locking members 38 between the front door 14 and the rear door 16 be of the same type as the locking members 36 described above, or may be of any suitable type. As one example, the locking members 38 may include a striker 60 and a latch 62 releasably engageable with each other.

The input device and/or handles 64 for automatic movement and manual movement, respectively, of the doors 14, 16 between the open and closed positions, as set forth above, may also trigger the locking members 36, 38. For example, in order to enter the vehicle 10, the input device may unlock the locking members 36, 38 and automatically move one or more doors 14, 16 to the open position. The computer, e.g., door module and/or door lock module, of the vehicle 10 may control operation of the locking members 36, 38 based on the input device. As another example, the handle 64 may be in mechanical or electronic communication with the locking members to unlock the locking members when the handle 64 is manually grasped by a person wishing to enter the vehicle 10.

The vehicle 10 includes at least one seat 18. For example, as shown in the Figures, the vehicle 10 may include four seats 18. Specifically, the vehicle 10 may include a seat 18 on each door 14, 16 of the left side 44 and of the right side 46.

The seat 18 is fixed relative to the door 14, 16. For example, the seat 18 may be fixed directly to the door 14, 16, or may be fixed relative to the door 14, 16 through an intermediate component. In any event, the seat 18 moves with the door 14, 16 as the door 14, 16 moves between the open and closed positions. When the door 14, 16 is in the open position, the weight of the seat 18 is supported entirely by the door 14, 16. When the door 14, 16 is in the closed position, the weight of the seat 18 is supported by the door 14, 16. Specifically, when the door 14, 16 is in the closed position, the weight of the seat 18 may be supported entirely by the door 14, 16, or may be supported both by the door 14, 16 and a floor 68 of the vehicle 10.

The seat 18 includes the seat bottom 22. The seat 18 may include the seat back 20, and the seat back 20 may be supported by the seat bottom 22 and may be stationary or movable relative to the seat bottom 22, e.g., the seat back 20 may recline relative to the seat bottom 22. Alternatively, the seat 18 may not include the seat back 20, i.e., the occupant may be supported on the seat bottom 22 and lean back against the door 14, 16.

The seat 18 may be a bucket seat, a bench seat, or another type of seat. The seat 18 may include seat belts (not shown) for retaining the occupant in the seat 18 when the seat belt is utilized. The seat 18 may include a head restraint (not shown). The head restraint may be supported by the seat back 20 and may be stationary or movable relative to the seat back 20.

The seat bottom 22 and/or the seat back 20 may include a frame and a covering supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The covering may include upholstery and padding. The upholstery may be formed of cloth, leather, faux leather, or any other suitable material. The upholstery may be stitched in panels around the frame. The padding may be between the covering and the frame, and may be foam or any other suitable material.

The seat 18 includes a track 24 fixed to the door 14, 16. The track 24 may be supported by the reinforcement 32. For example, the track 24 may be fixed directly to the reinforcement 32 with, for example, fasteners, welds, etc. The track 24 may include two rails 70, as shown in the Figures. The seat bottom 22 may include two shuttles 72 slideably engaged with the two rails 70.

The track 24 supports the rest of the seat 18 on the door 14, 16. Specifically, the track 24 supports the seat bottom 22 on the door 14, 16. The seat bottom 22, for example, may include posts extending downwardly and engaged with the track 24. The track 24 may also support the seat back 20 on the door 14, 16. Specifically, the seat back 20 may be supported on the track 24 indirectly through the seat bottom 22, or may be directly in contact with and directly supported on the track 24.

The track 24 may be cantilevered from the door 14, 16, e.g., when the door 14, 16 is in the open position. The track 24 and/or the seat bottom 22 may include a bracket 66 that engages and is supported on the floor 68 of the vehicle 10 when the door 14, 16 is in the closed position. The bracket 66 may be at a distal end of the track 24.

The seat bottom 22 extends from the seat back 20 toward the longitudinal axis L along a cross-vehicle direction perpendicular to the longitudinal axis L when the door 14, 16 is in the closed position. For example, when the front door 14 of the left side 44 and the front door 14 of the right side 46 are in the closed position, the seat bottoms 22 may extend from the respective seat back 20 toward each other. In other words, the seat bottom 22 of the seat 18 on the front door 14 of the left side 44 extends from the seat back 20 of the seat 18 on the front door 14 of the left side 44 toward the seat 18 on the front door 14 of the right side 46; and the seat bottom 22 of the seat 18 on the front door 14 of the right side 46 extends from the seat back 20 of the seat 18 on the front door 14 of the right side 46 toward the seat 18 on the front door 14 of the left side 44. Similarly, the seat bottom 22 of the seat 18 on the door 14, 16 of the left side 44 extends from the seat back 20 on the rear door 16 of the left side 44 toward the seat 18 on the rear door 16 of the right side 46; and the seat bottom 22 of the seat 18 on the rear door 16 of the left side 44 extends from the seat back 20 of the seat 18 on the rear door 16 of the right side 46 toward the seat 18 on the rear door 16 of the left side 44.

The seat bottom 22 may extend from the seat back 20 along the longitudinal axis L when the doors 14, 16 are in the open position. When the front door 14 and the adjacent rear door 16 are in the open position, the seat bottoms 22 of the front seat 18 and rear seat 18 may extend from the respective seat back 20 toward each other. For example, when the front door 14 and the rear door 16 of the left side 44 are in the open position, the seat bottom 22 on the front door 14 of the left side 44 extends from the seat back 20 on the front door 14 of the left side 44 toward the seat 18 on the rear door 16 of the left side 44; and the seat bottom 22 on the rear door 16 of the left side 44 extends from the seat back 20 on the rear door 16 of the left side 44 toward the seat 18 on the front door 14 of the left side 44. Similarly, when the front door 14 and the rear door 16 of the right side are in the open position, the seat bottom 22 on the front door 14 of the right side 46 extends from the seat back 20 on the front door 14 of the right side 46 toward the seat 18 on the rear door 16 of the right side 46; and the seat bottom 22 on the rear door 16 of the right side 46 extends from the seat back 20 on the rear door 16 of the right side 46 toward the seat 18 on the front door 14 of the right side 46.

The seat bottom 22 may be moveable along the track 24. The seat bottom 22 and the seat back 20 may move together as a unit relative to the track 24. For example, the seat bottom 22 and the seat back 20 may be moveable along the track 24 toward and away from the door 14, 16. Specifically, the shuttles 72 of the seat bottom 22 slide along the rails 70 to move the seat bottom 22 relative to the track 24 and the door 14, 16.

The seat bottom 22 and the seat back 20 may be moveable along the track 24 in the cross-vehicle direction when the door 14, 16 is in the closed position. Accordingly, when the door 14, 16 is in the closed position, the occupant may move the seat bottom 22 and the seat back 20 to a desired position inside the vehicle 10. As another example, the seat bottom 22 and the seat back 20 may be moveable along the track 24 when the door 14, 16 is in the open position to position the seat bottom 22 and/or the seat back 20 for easier loading and/or unloading of the passenger.

The vehicle 10 may include the seat motor 26, which is engaged with the seat bottom 22, e.g., the shuttles 72, and the track 24, e.g., the rails 70, to move the seat bottom 22 and the seat back 20 along the track 24. The seat motor 26 may be of any suitable type. The seat motor 26 may be automatically operated and/or manually operated. For example, the vehicle 10 may include an input device (e.g., the same input device that operates the door motors 52, or a different input device) that controls the motors 26, 52. The input device may, for example, be a button or a touch screen on the body 12 or the seat 18 to allow the occupant of the seat 18 to manually control the seat motor 26.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a body having a longitudinal axis;
a door supported by the body and moveable about a rotational axis relative to the body between open and closed positions; and
a seat fixed relative to the door and moveable as a unit with the door about the rotational axis between the open and closed positions, the seat including a seat back and a seat bottom;
the seat bottom extending from the seat back toward the longitudinal axis along a cross-vehicle direction perpendicular to the longitudinal axis when the door is in the closed position.

2. The vehicle as set forth in claim 1, wherein the seat includes a track fixed to the door, and the track supports the seat bottom on the door.

3. The vehicle as set forth in claim 2, wherein the track is cantilevered from the door.

4. The vehicle as set forth in claim 2, wherein the seat bottom is moveable along the track in the cross-vehicle direction when the door is in the closed position.

5. The vehicle as set forth in claim 3, wherein the door includes a door outer, a door inner, and a reinforcement between the door outer and the door inner, the track being supported by the reinforcement.

6. The vehicle as set forth in 4, further comprising a seat motor engaged with the seat bottom and the track to move the seat bottom along the track.

7. The vehicle as set forth in claim 1, further comprising a rocker below the door in the closed position, and locking members between the rocker and the door, the locking members releasably locking the rocker and the door to each other.

8. The vehicle as set forth in claim 7, wherein the door includes a door outer, a door inner, and a reinforcement between the door outer and the door inner, the track being supported by the reinforcement.

9. The vehicle as set forth in claim 1, further comprising a rocker below the door in the closed position, wherein the door includes a door outer, a door inner, and a reinforcement between the door outer and the door inner, and further comprising locking members releasably locking the rocker and the door to each other.

10. The vehicle as set forth in claim 1, further comprising a second door supported by the body and moveable relative to the body between open and closed positions, and a second seat fixed relative to the second door, the second seat including a seat back and a seat bottom, the seat back and the seat bottom of the second seat extending from the seat back of the second seat toward the longitudinal axis along the cross-vehicle direction when the second door is in the closed position.

11. The vehicle as set forth in claim 10, wherein the door and the second door are adjacent to each other in the closed position, and further comprising locking members between the door and the second door, the locking members releasably locking the door and the second door to each other when the door and the second door are in the closed position.

12. The vehicle as set forth in claim 11, wherein, when the door and the second door are in the open position, the seat bottom of the seat extends from the seat back of the seat toward the second seat, and the seat bottom of the second seat extends from the seat back of the second seat toward the seat.

13. The vehicle as set forth in claim 10, further comprising a forward pillar, a rearward pillar, and a door opening extending continuously from the forward pillar to the rearward pillar, the door being hinged to the forward pillar, and the second door being hinged to the rearward pillar.

14. The vehicle as set forth in claim 13, wherein the door and the second door abut each other between the forward pillar and the rearward pillar when the door and the second door are in the closed position.

15. The vehicle as set forth in claim 10, wherein the door and the second door are spaced from each other on opposite sides of the longitudinal axis.

16. The vehicle as set forth in claim 15, wherein, when the door and the second door are in the closed position, the seat bottom of the seat extends from the seat back of the seat toward the second seat, and the seat bottom of the second seat extends from the seat back of the second seat toward the seat.

17. The vehicle as set forth in claim 1, further comprising a door motor between the body and the door to move the door relative to the body between the open position and the closed position.

18. The vehicle as set forth in claim 1 wherein the seat bottom extends from the seat back to an end spaced from the seatback, and the seat bottom extends in the cross-vehicle direction from the seat back to the end when the door is in the closed position.

19. A vehicle comprising:
a body having a longitudinal axis;
a door supported by the body and moveable relative to the body between open and closed positions;
a seat fixed relative to the door and including a seat back and a seat bottom;
the seat bottom extending from the seat back toward the longitudinal axis along a cross-vehicle direction perpendicular to the longitudinal axis when the door is in the closed position;
the seat including a track fixed to the door, and the track supporting the seat bottom on the door;
the seat bottom being moveable along the track in the cross-vehicle direction when the door is in the closed position; and
a seat motor engaged with the seat bottom and the track to move the seat bottom along the track.

20. A vehicle comprising:
a body having a longitudinal axis;
a door supported by the body and moveable relative to the body between open and closed positions;
a seat fixed relative to the door and including a seat back and a seat bottom;
the seat bottom extending from the seat back toward the longitudinal axis along a cross-vehicle direction perpendicular to the longitudinal axis when the door is in the closed position; and
a door motor between the body and the door to move the door relative to the body between the open position and the closed position.

* * * * *